MAGNETIC SOUND RECORDING AND REPRODUCING MACHINE

Filed Oct. 2, 1950 7 Sheets-Sheet 1

INVENTORS
CHESTER A. DEMBY
BY ALVIN A. SELDNER JR.
Frederick Diehl
ATTORNEY

MAGNETIC SOUND RECORDING AND REPRODUCING MACHINE

Filed Oct. 2, 1950

INVENTORS
CHESTER A. DEMBY
BY ALVIN A. SELDNER JR.
Frederick Diehl
ATTORNEY

MAGNETIC SOUND RECORDING AND REPRODUCING MACHINE

INVENTORS
CHESTER A. DEMBY
ALVIN A. SELDNER JR.
BY Frederick Diehl
ATTORNEY

MAGNETIC SOUND RECORDING AND REPRODUCING MACHINE

Filed Oct. 2, 1950 7 Sheets-Sheet 4

INVENTORS
CHESTER A. DEMBY
BY ALVIN A. SELDNER JR.
Frederick Diehl
ATTORNEY

MAGNETIC SOUND RECORDING AND REPRODUCING MACHINE

Filed Oct. 2, 1950 7 Sheets-Sheet 5

INVENTORS
CHESTER A. DEMBY
BY ALVIN A. SELDNER Jr.
Frederick Diehl
ATTORNEY

MAGNETIC SOUND RECORDING AND REPRODUCING MACHINE

Filed Oct. 2, 1950 7 Sheets-Sheet 6

INVENTORS.
CHESTER A. DEMBY
BY ALVIN A. SELDNER JR.
Frederick Diehl
ATTORNEY

MAGNETIC SOUND RECORDING AND REPRODUCING MACHINE

Filed Oct. 2, 1950 7 Sheets-Sheet 7

INVENTORS
CHESTER A. DEMBY
BY ALVIN A. SELDNER JR.
Frederick Diehl
ATTORNEY 2,703,714

United States Patent Office

Patented Mar. 8, 1955

2,703,714

MAGNETIC SOUND RECORDING AND REPRODUCING MACHINE

Chester A. Demby, Burbank, and Alvin A. Seldner, Jr., Lawndale, Calif.; said Seldner, Jr., assignor to said Demby Application October 2, 1950, Serial No. 187,888

2 Claims. (Cl. 274—4)

This invention relates generally to sound recording and reproducing machines which utilize either a tape or wire as the magnetic recording medium.

Among the many important objects of this invention are the following:

1. To provide means by which the operator may preselect any one, several, or all predetermined sections or portions of a reel or spool of magnetically recorded tape or wire medium for reproduction automatically upon starting the machine.

2. To provide means by which the operator may reject or cancel any of the preselected sections of the magnetic recorded tape during reproduction thereof, so as to skip such sections.

3. To provide means by which the operator, during reproduction of the preselected section or sections of the recorded media, may select additional sections thereof or substitute others for those originally selected.

4. To provide means by which the operator may cause all selected sections of the recorded media to be automatically repeated indefinitely in the preselected sequence.

5. To provide means by which the recorded media may be automatically rewound upon the original reel or spool and the machine then stopped automatically following reproduction of the selected sections of the recorded media, unless the operator has set the controls for a repetition of the preselected sections.

6. To provide means by which the loud speaker circuit will be disrupted during such times in the operation of the machine as sections of the recorded media not selected for reproduction, are being skipped, or the tape is being rewound on the original reel, thus preventing distorted sound reproductions from being rendered audible at the speaker.

7. To provide means by which the operator may, during the recording or reproducing operation, cause the tape to be started at any selected time.

With these and other objects in view, this invention resides in the combinations, arrangements and functional relationships of elements as set forth in the following specification and particularly pointed out in the appended claims.

In the accompanying drawings.

Referring specifically to the drawings, this invention, for the purpose of illustration, is shown embodied in a sound recording and reproducing machine which uses a tape T as the magnetic recording medium. However, it is to be understood that the invention is equally well adapted for use with machines employing wire instead of tape as the record medium. Furthermore, it is within the province of this disclosure to use tape or wire which is either electrically conductive or non-conductive.

Figures 3, 4, 5:
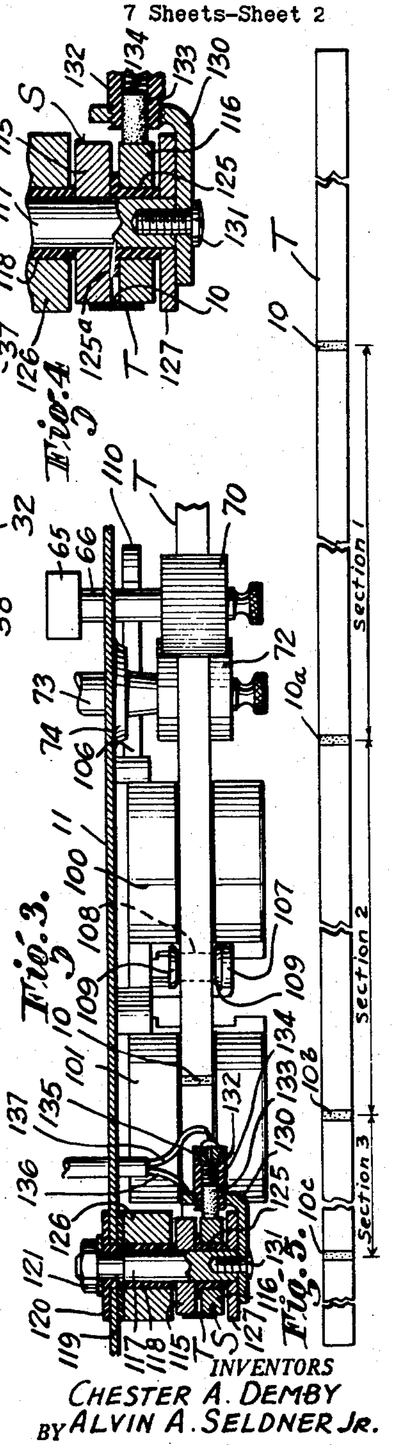
Figure 3 is an enlarged fragmentary detail sectional view taken on the line 3—3 of Figure 2.
Figure 4 is an enlarged fragmentary detail sectional view taken on the line 4—4 of Figure 2.
Figure 5 is a plan view of the magnetic record tape as embodying this invention.
Figure 6:
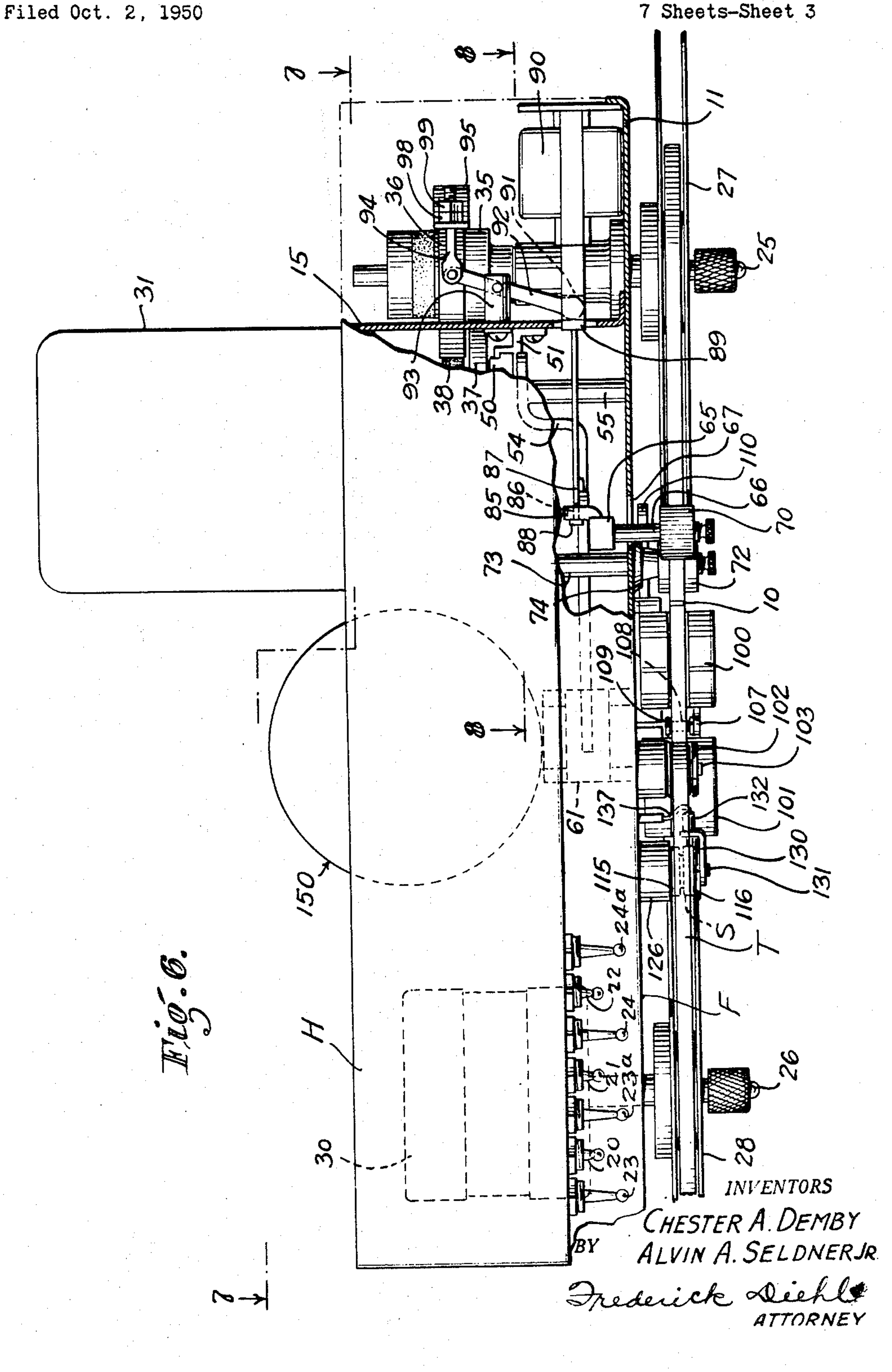
Figure 6 is a plan view partly broken away to expose internal mechanism of the machine.

For the purpose of this invention, the tape T on which a number of separate recordings are assumed to have been made at spaced locations along its length, is suitably impressed, impregnated, coated or otherwise physically altered between successive recordings and at the ends thereof to provide a line, band, or area extending across the width of the tape. In this illustration, the tape is assumed to have three recordings, so that there will be four of the areas which are designated as 10, 10*a*, 10*b*, 10*c* as shown in Figure 5. With the use of a tape which is electrically non-conducting in accordance with the present disclosure, each area is an electrical conductor and may be in the form of a suitable metallic paint applied either by hand or by an applicator device (not shown) forming no part per se, of the present invention. With the use of a record medium of electrical conducting material, the areas will be formed of an electrically insulating substance.

Regardless of whether the areas 10, 10*a*, 10*b* and 10*c* are formed of an electrically conducting or non-conducting substance, the function thereof in initiating various operations of the machine, will be the same. These areas which are hereinafter referred to in the specification and claims as "control areas", are therefore to be broadly construed as covering either electrically conductive or non-conductive material depending on which type of record medium is being used.

The sound recording and reproducing machine embodying this invention comprises a generally rectangular box-type frame F providing a front panel 11, rear panel 12, top and bottom panels 13 and 14, respectively, and end panels 15. Rigidly supported on top of the frame F is a rectangular housing H containing various electrical units embodied in this invention and having a control panel 16 on which is mounted manual selector switches 20, 21 and 22, starting switches 23 and 23*a*, a switch 24 for stopping the machine in an emergency as well as for threading the tape T through the machine, and a reset switch 24*a*.

Mounted on the front panel 11 for rotation about parallel axes, are forward and reverse spindles 25 and 26, respectively, on which are detachably secured so as to be driven by the spindles, forward and reverse reels or spools 27 and 28, respectively, to which the ends of the tape are secured for winding of the tape from one reel and unwinding from the other reel or vice versa depending on which spindle is being driven.

Figure 1:
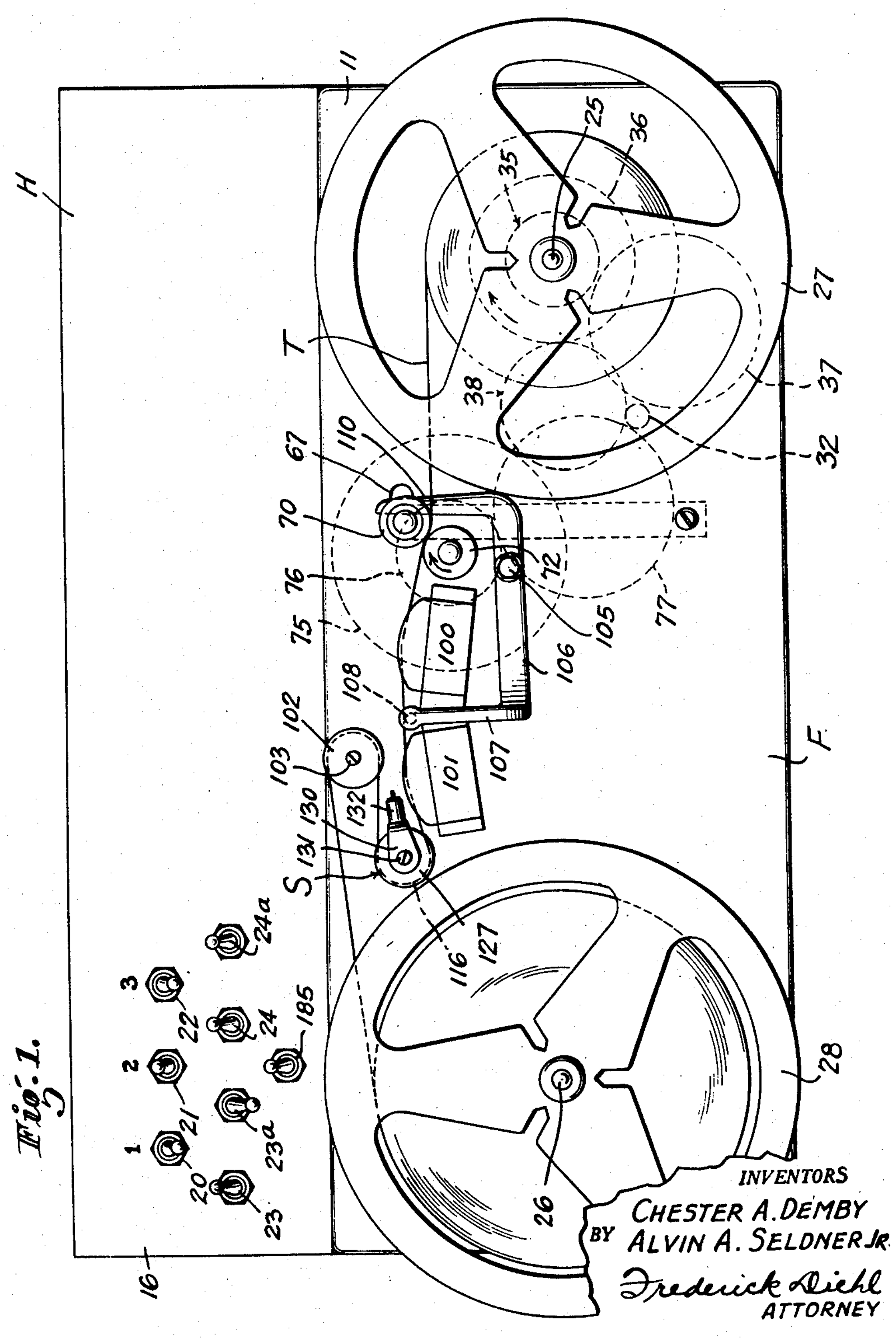
Figure 1 is a view in front elevation, of one form of magnetic sound recording and reproducing machine embodying this invention, with the magnetic record tape in its active or reproducing position with respect to the reproducing head of the machine.

The reverse spindle 26 is direct-connected to the shaft of an electric motor 30 supported at the back of the front panel 11 for driving of this spindle by its motor in a counter-clockwise direction as viewed in Figure 1. A second electric motor 31 is supported at the back of the rear panel 12 at a location laterally offset from the forward spindle 25, and with the shaft 32 of this motor projecting into the frame F in parallelism with the axis of the forward reel spindle 25.

Fixed to the forward reel spindle 25 are high and low speed friction wheels 35 and 36, respectively, which are adapted to be selectively driven by the motor shaft 32 through the medium of idler friction wheels 37 and 38, respectively, to accordingly rotate the forward reel 27 in a clockwise direction as viewed in Figure 1, at a relatively high speed to rapidly wind the tape thereon when skipping a portion of the tape, or at a relatively low speed for reproducing the record on the tape.

Figure 7:
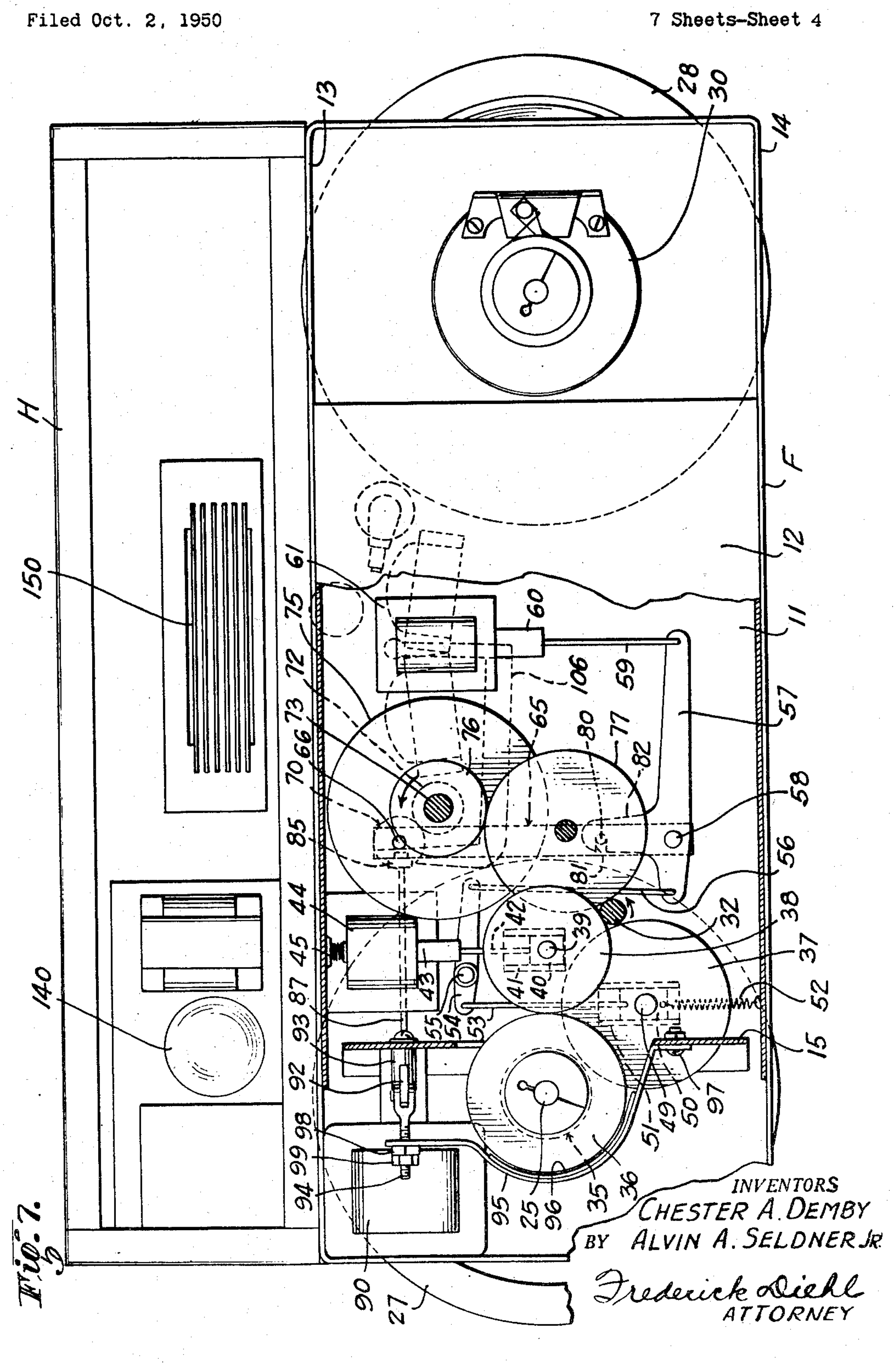
Figure 7 is a longitudinal, vertical sectional view taken on the line 7—7 of Figure 6.

As shown in Figure 7, the idler wheel 38 is rotatably mounted by means of a shaft 39, in a bearing block 40 slidable in a fixed guide 41. By means of a link 42, the core 43 of a solenoid 44 is connected to the bearing block 40. A spring 45 co-acts with the core 43 to normally urge the idler wheel 38 to the extreme position shown in this figure wherein the idle wheel 38 engages the motor shaft 32 and low speed friction wheel 36 to drive the spindle 25 when current is supplied to the forward motor 31. However, upon energization of the solenoid 44 in a manner to be hereinafter fully described, the idler wheel 38 is shifted to disengage the motor shaft 32 and low speed friction wheel 36 so as to disrupt the operative connection between them.

The idler wheel 37 is rotatably mounted by means of a shaft 49 in a bearing block 50 slidable in a fixed guide 51 and normally urged by a spring 52 to move this idler wheel to the extreme position shown in Figure 7, so as to disengage the motor shaft 32 and high speed friction wheel 35. One end of a link 53 is connected to the bearing block 50 and is connected at its other end to one end of a lever 54 mounted between its ends on the front panel 11 for pivotal movement about a fixed axis 55. To the other end of the lever 54 is connected one end of a second link 56, the other end of which is connected to one end of a second lever 57 also mounted between its ends on the front panel 11 for pivotal movement about a fixed axis 58.

Figures 8, 9:
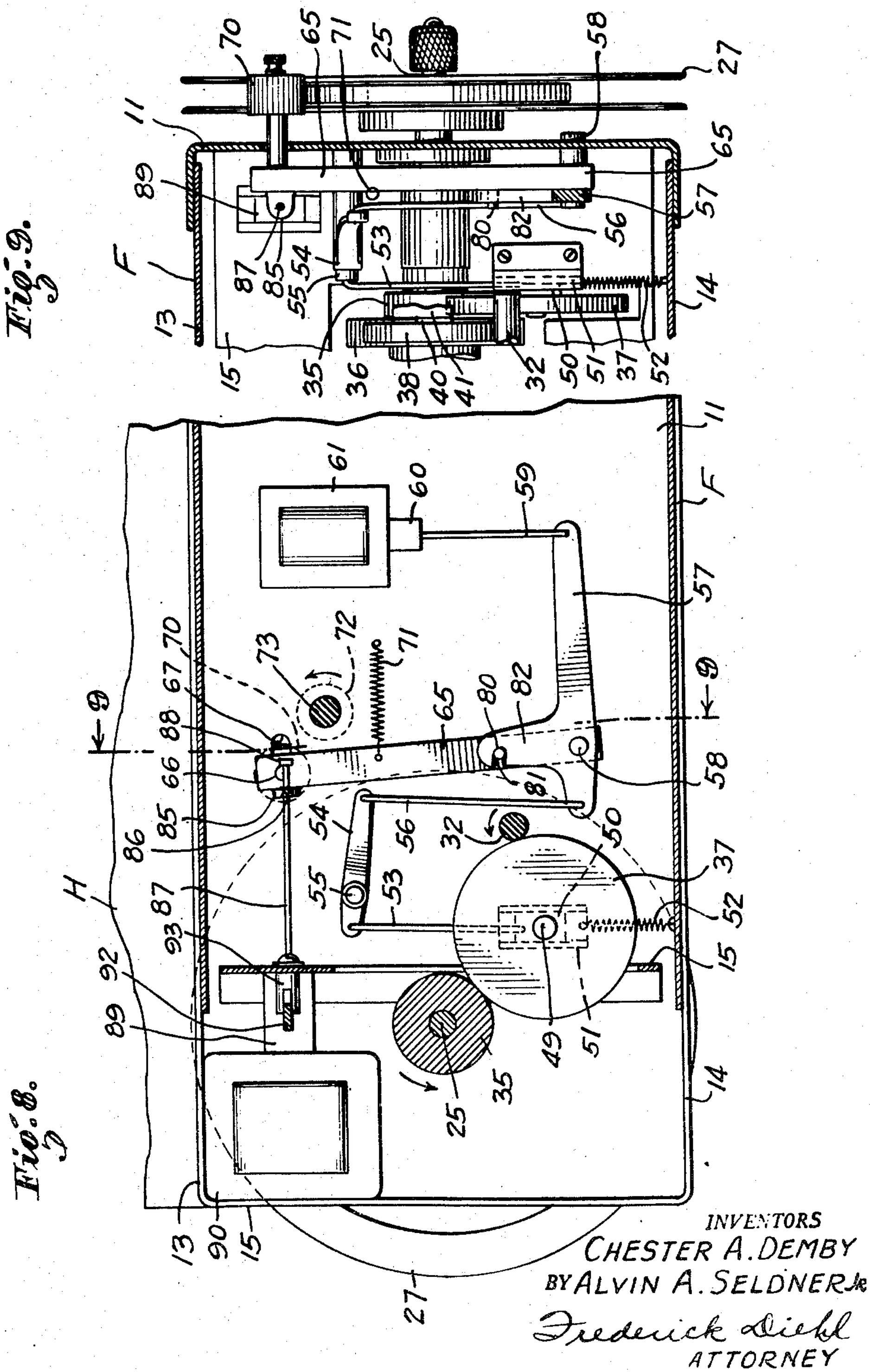
Figure 8 is a longitudinal, vertical sectional view taken on the line 8—8 of Figure 6.
Figure 9 is a transverse, vertical sectional view taken on the line 9—9 of Figure 8.
Figure 10:
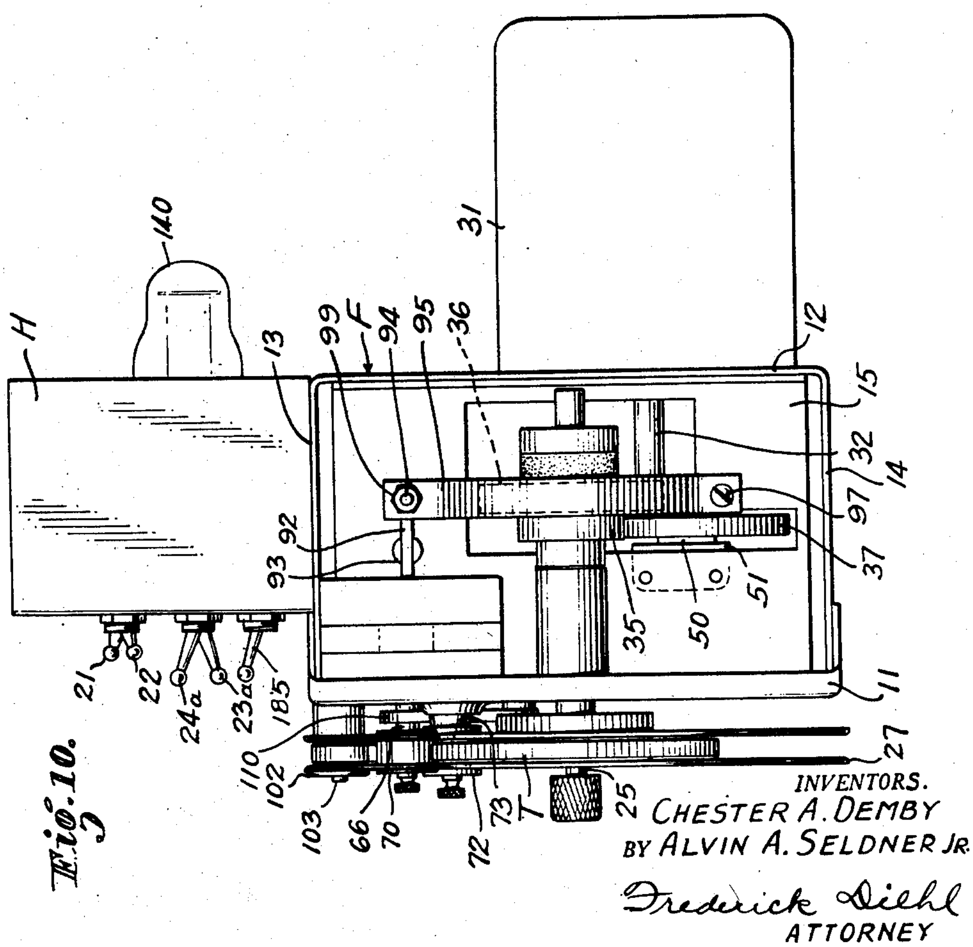
Figure 10 is a view in end elevation, of the sound recording and reproducing machine embodying this invention.

To the other end of the lever 57 is connected one end of a third link 59, the other end of which is connected to the core 60 of a solenoid 61, which, when energized, moves the idler wheel 37 to the position shown in Figure 8 wherein the motor shaft 32 and high speed friction wheel 35 are engaged to operatively connect them and drive the forward spindle 25 when current is supplied to the forward motor 31.

Mounted at one end for pivotal movement about the fixed axis 58 of the lever 57, is an arm 65, to the other end of which is fixed a stub shaft 66 projecting freely through a slot 67 in the front panel 11 and having rotatably mounted thereon a friction roller 70.

By means of a spring 71 connected to the arm 65, the friction roller 70 is normally urged into engagement with a driving capstan 72 fixed to a shaft 73 journaled in a bearing 74 in the front panel 11 and projecting through the latter into the frame F. Fixed to the shaft 73 within the frame F is a flywheel 75 and a friction drive wheel 76, which latter through the medium of an idler friction wheel 77, is operatively connected to the forward motor shaft 32 so as to be driven by the latter in a clockwise direction as viewed in Figure 1, when current is supplied to the forward motor 31.

It will be noted from Figures 7 and 8, that a pin 80 projects from the arm 65 into a slot 81 in an angularly projecting leg 82 of the lever 57 so as to move the friction roller 70 out of engagement with the capstan 72 when the solenoid 61 is energized, yet permit this disengaging movement of the friction roller 70 to be effected independently of the arm 65. Therefore, the pin 80 and slot 81 co-act to provide a lost motion operative connection between the lever 57 and arm 65.

Projecting from the arm 65 is an ear 85 having an opening 86 freely receiving a rod 87 having a head 88 on one end and connected at its other end to the core 89 of a solenoid 90 operable when energized, to cause the head 88 to co-act with the ear in moving the arm 65 in a direction to disengage the friction roller 70 from the capstan 72. The headed rod 87 and the ear 85 co-act in providing a lost motion operative connection rendering the arms 65 operable by the solenoid 61 independently of the solenoid 90.

The core 89 of the solenoid 90 is provided with an opening 91 in which freely works one end of a lever 92 pivotally mounted on a bifurcated pin 93 projecting from one of the end panels 15 of the frame F. The other end of the lever 92 is pivotally connected to one end of a threaded rod 94 passing through an opening in one end of a spring metal brake band 95 of arcuate form supporting an internal brake shoe 96 and secured at its other end to said one end panel 15 by a fastening member 97. Threaded on the rod 94 is an adjusting nut 98 and a check nut 99 co-actable with the brake band 95 to apply a braking force to the low speed friction wheel 36 and hence to the forward reel 27 upon the aforestated energization of the solenoid 90.

Supported on the outer side of the front panel 11 between the reels 27 and 28 is a conventional magnetic recording and reproducing head 100 and an erasing head 101, with the magnets of which the tape T has wiping contact during travel of the tape from one reel to the other. For reproducing, the tape T is threaded through the machine from the reverse or left hand reel 28 as viewed in Figure 1, by first being trained about a flanged idler pulley 102 rotatably mounted on a fixed shaft 103 projecting from the front panel, and then trained about a selector head S which broadly constitutes an electrical switch device co-actable with the areas 10, 10*a*, 10*b* and 10*c* to activate an electrical circuit in a manner to be later fully described.

From the head S the tape is passed across the heads 101 and 100 and then between the capstan roller 72 and friction roller 70 to the forward or right hand reel 27, so that when the tape is taut, it will be held against the magnets of the heads 100 and 101 for recording, reproducing, or erasing as the case may be.

Pivotally mounted between its ends on a pin 105 projecting from the front panel 11 is a tape actuating member 106 in the form of a lever, from one end of which laterally projects an arm 107, the outer end of which is provided with a pin 108 having spaced flanges 109 between which the tape T is adapted to travel and be guided. The other end of the member 106 is also provided with a laterally projecting arm 110 which is normally urged by the unbalanced weight of the member 106 about its pivot pin 105, into engagement with the stub shaft 66 on which the friction roller 70 is mounted. In this normal position of the member 106 as shown in Figure 1, the member is inactive with respect to the tape T, so that the latter clears the pin 108 in order for the tape to be actively related to the heads 100 and 101.

Figure 2:
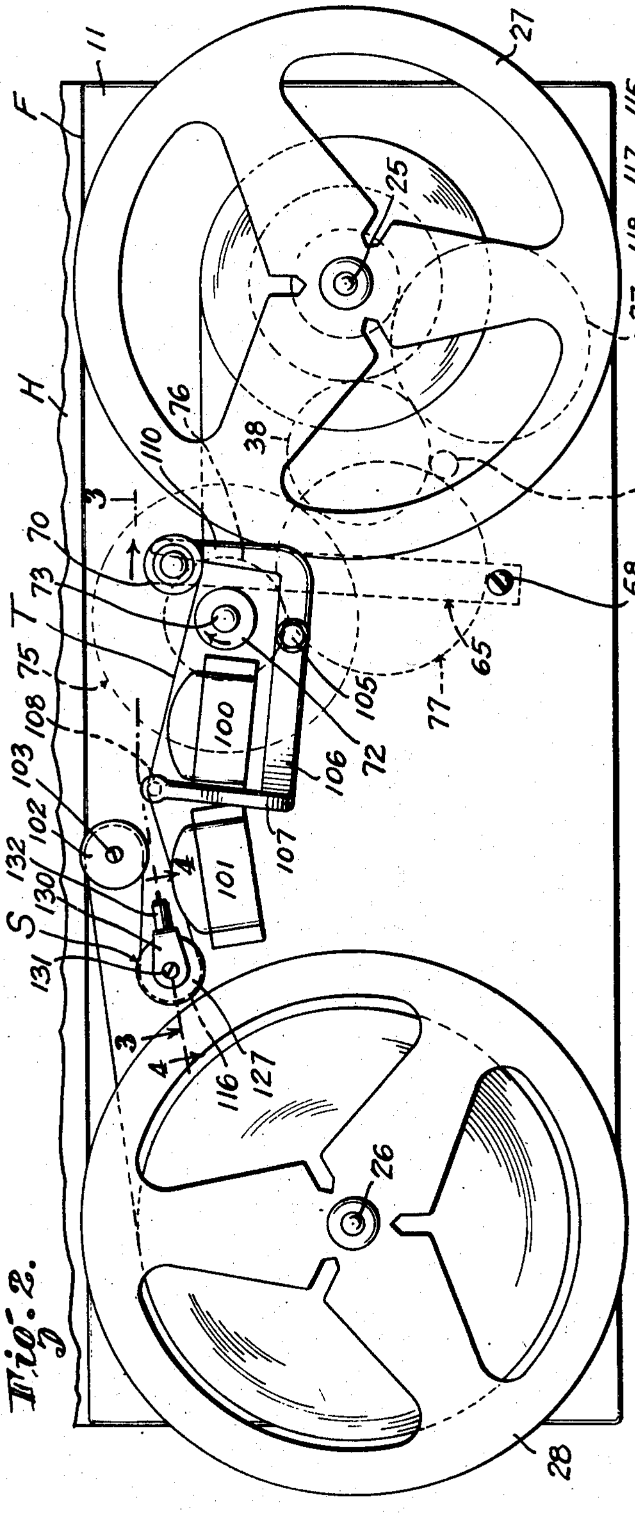
Figure 2 is a view similar to Figure 1, but with the magnetic record tape moved to an inactive or non-reproducing position with respect to the reproducing head of the machine.

However, upon disengagement of the friction roller 70 from the capstan 72 by energization of either the solenoid 61 or 90, the stub shaft 66 will co-act with the arm 110 to move the member 106 about its pivot pin 105 to the position shown in Figure 2 so as to cause the pin 108 to co-act with the tape T in moving the tape to an inactive position with respect to the head 100 as shown in this figure.

In its illustrated embodiment the selector head S is designed for use with an electrically non-conductive magnetic record tape to which the control areas 10, 10*a*, 10*b* and 10*c* of an electrical conducting substance, are applied, respectively, between succeeding individual recordings along the length of the tape. The head S is composed of two switch elements in the form of metallic contact wheels 115 and 116 of the same diameter which are coaxially related and are spaced apart. The contact wheel 115 is rotatably mounted directly on a fixed metallic axle 117 so as to have constant electrical contact therewith. The axle 117 is electrically insulated from the frame F by an insulating sleeve 118 and insulating washers 119, 120, and is rigidly secured to the frame by a nut 121.

The contact wheel 116 is rotatably mounted on an insulating sleeve 125 fitted on the axle 117 and is provided with an annular flange 125*a* to definitely space the wheels 115 and 116 from each other. A tape retaining flange 126 of slightly larger diameter than the contact wheels, is mounted on the insulating sleeve 118 clear of the wheel 115 so as to permit the latter to rotate freely, whereas a second retaining flange 127 of the same diameter as the flange 126 is mounted on the outer end of the axle 117 and is held clear of the wheel 116 by the insulating sleeve 125 so as to permit free rotation of the wheel 116.

An L-shaped bracket 130 is rigidly secured to the outer end of the axle 117 by a screw 131 and holds the retaining flange 127 rigidly in place on the axle, all as clearly shown in Figures 3 and 4. The bracket 130 has a threaded opening into which is screwed a brush holder 132 of electrical insulating material so as to rigidly support the holder on the bracket.

Figure 11:
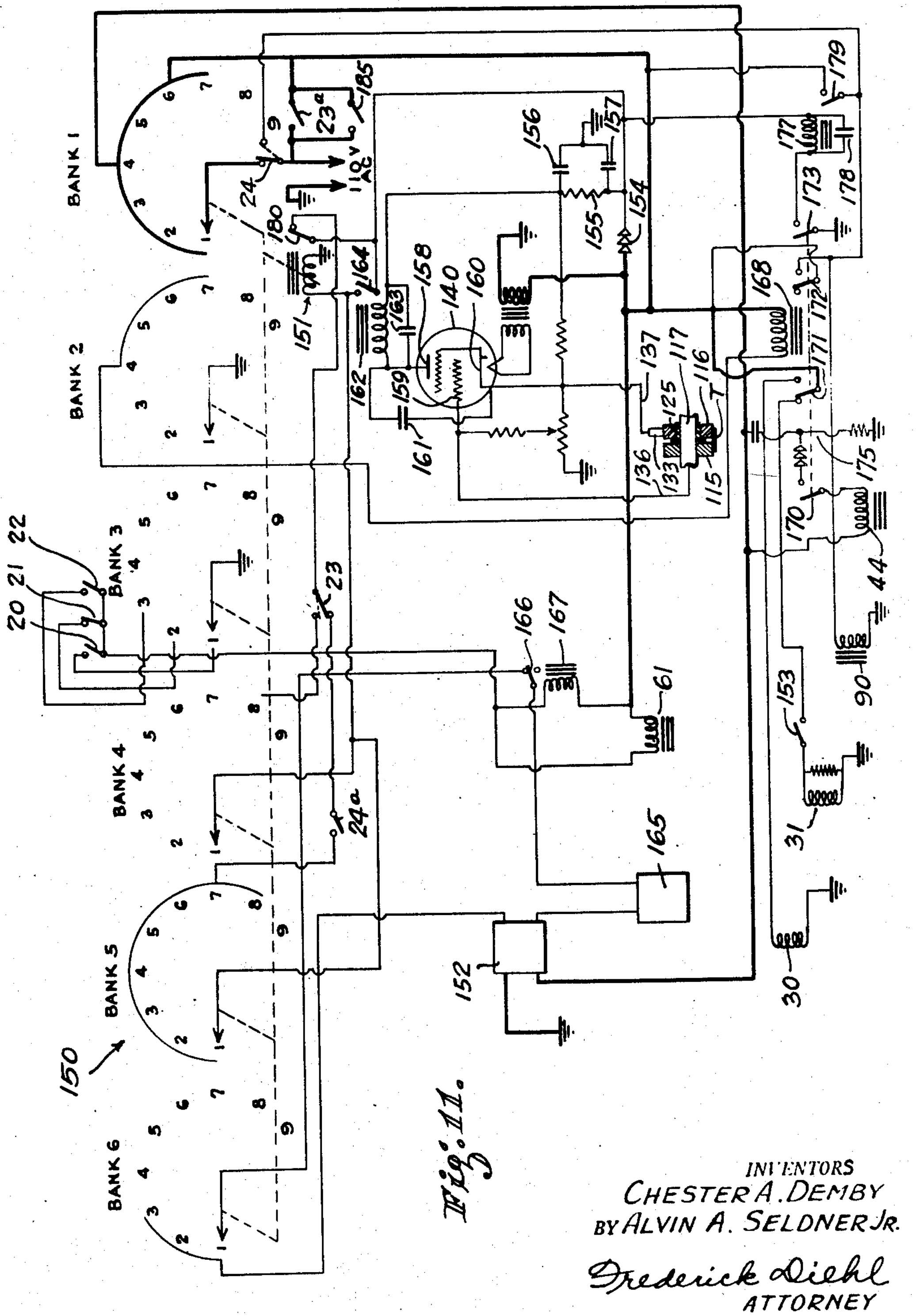
Figure 11 is a schematic view of one form of electrical circuit embodied in the sound recording and reproducing machine.

A carbon or other form of brush 133 is mounted in the holder 132 for movement radially with respect to the axis of the axle 117 and is urged by a coil spring 134 to lightly bear against the pheriphery of the contact wheel 116, the spring being retained in the holder 132 by a metallic plug 135. Connected to the bracket 130 and to the plug 135 are conductors 136 and 137, respectively, which, with the contact wheels 115 and 116, form part of an electric trigger circuit including an electronic device in the form of a tetrode tube 140 of the thyratron type as illustrated in Figure 11. It will be clear that the contact wheels 115 and 116 normally constitute an open electric switch, and that the tape T spans the space between the wheels and rides on the peripheries thereof during travel of the tape from one reel to the other in the operation of the machine. As the tape is electrically non-conductive, the trigger circuit will be disrupted at the contact wheels. However, whenever one of the control areas 10, 10*a*, 10*b* or 10*c* on the tape engages the contact wheels and bridges the latter as shown in Figure 4, the switch formed by the wheels will be closed to complete the trigger circuit at this point.

As shown diagrammatically in Figure 11, the electrical circuits also include a conventional stepping switch 150 of the continuous rotation type having the usual actuating coil 151, and with which stepping switch the manual selector switches 20, 21 and 22 are associated. For the purpose of this illustration in which the tape T is divided into three recorded sections by the control areas 10, 10*a*, 10*b* and 10*c*, the stepping switch 150 is provided with 6 banks and 9 positions. The stepping switch occupies position No. 9 when the machine is at rest, and controls various instrumentalities of the machine during the operation of the machine which is as follows:

The tape T is threaded through the machine by first manually moving the switch 24 to the position shown in broken lines in Figure 11 so as to supply current from the 110 volt A. C. source to the solenoid 90, which, through rod connection 87 and arm 65, moves the friction roller 70 out of engagement with the driving capstan 72, thus permitting the tape to be readily inserted between the roller and capstan.

The switch 24 is now moved to the position shown in full lines in Figure 11, so as to denergize the solenoid 90 and release the roller 70 and thus render the spring 71 free to move the roller into engagement with the tape T and firmly press the tape into driving engagement with the capstan 72. Thus, when the forward motor 31 is in operation, the tape will be driven at reproducing speed through the operative connection provided by the idler friction wheel 77 and friction drive wheel 76 between the capstan and the motor shaft 32.

Assuming that it is desired to reproduce sections 1 and 3 of the three recordings on the tape T and to skip section 2, the selector switches 20 and 22 are now opened, the switch 23 moved to the broken line position in Figure 11, and the switch 23*a* closed. Current from the 110 volt A. C. line will now be supplied to the amplifier 152 and to the trigger circuit including the tube 140. Current from this source will also be supplied to the forward motor 31 through a thermo switch 153 which delays starting of the motor until the tube 140 and the tubes of the amplifier 152 have been heated to operating temperature.

The forward reel 27 will now be frictionally driven through the idler friction wheel 38 and wheel 36 at a speed sufficient for the tape to wind upon the reel as the tape is being fed at reproducing speed by the capstan 72.

From Figure 11 it will be noted that by means of a rectifier 154, the 110 volt A. C. is changed into pulsating direct current which is filtered by a resistor 155 and condensers 156 and 157 so as to place a positive potential on the anode 158 of the tube 140. It will also be noted that the control grid 159 of the tube 140 is normally at a negative potential with respect to the cathode 160 of the tube so that no current will flow from the cathode to the anode.

When the first control area 10 on the tape T momentarily bridges the contact wheels 115 and 116 of the selector head S, the grid 159 and cathode 160 will be placed at the same potential so as to permit current to flow from the cathode to the anode. By means of a condenser 161 the tube 140 is now caused to oscillate. Current from the anode 158 will now energize a relay 162 and will charge a condenser 163. Energization of the relay 162 will close a switch 164 through which latter direct current will be supplied to the solenoid 151 of the stepping switch 150 so as to move the latter from position No. 9 to the position No. 1 shown in Figure 11.

Because of the condenser 161, the anode current is now of a saw tooth wave form, and when the control area 10 passes out of engagement with the contact wheels 115 and 116, the control grid 159 will become sufficiently negative to disrupt the flow of current through the tube 140. The condenser 163 is now discharged through relay 162 maintaining the latter closed for a sufficient length of time for the stepping switch to complete its stepping movement.

The speaker 165 is now supplied with current through bank 6 of the stepping switch and through the switch 166 of a relay 167, so as to reproduce the recording of section 1 of the tape T. When the reproduction of section 1 has been completed and the second control area 10*a* bridges the contact wheels 115 and 116, the stepping switch is advanced from position No. 1 to position No. 2 by the above described operation of the tube 140.

Through bank 3 of the stepping switch, current is now being supplied to energize the solenoid 61, which, through its core 60, link 59, lever 57, pin 80 and arm 65, moves the friction roller 70 out of engagement with the driving capstan 72 so as to free the tape from its driving connection with the capstan as shown in Figure 8. Following disengagement of the tape from the capstan 72, the movement of the lever 57 by the solenoid 61, shifts the idler friction wheel 37 into engagement with the shaft 32 of the forward motor 31, through the medium of the link 56, lever 54, link 53 and bearing block 50 as shown in this figure, so as to drive the forward reel 27 at a high speed to rapidly feed the tape and skip section 2 thereof in accordance with the presetting of the selector switch 21.

The actuation of the arm 65 by the solenoid 61 also moves the tape actuating member 106 from the extreme position shown in Figure 1 to that shown in Figure 3, through the medium of the shaft 66 of the roller 70, so as to cause the tape to be raised by the pin 108 of the member 106 out of engagement with the magnets of the heads 100 and 101, thus obviating premature wearing of the heads and also reducing the wear upon the tape to a minimum. Current is also being supplied through bank 3 of the stepping switch to the relay 167 so as to open the switch 166 and thus discontinue the supply of current to the speaker 165 in order that there will be no reproduction of distorted sounds from the high speed skipping movement of the tape.

When section 2 of the tape has been skipped, the third control area 10*b* on the tape momentarily bridges the contact wheels 115 and 116. As the selector switch 22 has been opened to select the recording on section 3 for reproduction, the stepping switch 150 is advanced from position No. 2 to position No. 3 by the previously described operation of the tube 140, so as to disrupt the flow of current to the solenoid 61 and relay 167, thus again closing the circuit to the speaker 165 through the switch 166 and bank 6 of the stepping switch, and permitting the spring 71 to restore the arm 65 to the position shown in Figure 7 wherein the friction roller 70 again engages the tape T and presses same into driving engagement with the capstan 72.

The spring 52 is now free to move the idler friction wheel 37 out of engagement with the motor shaft 32 and the high speed friction wheel 36 so as to disrupt this driving connection to the forward reel 27. Concurrently, the tape actuating member 106 is restored by gravity to its extreme or idle position shown in Figure 1, so as to permit the tape to again rest upon the magnets of the heads 100 and 101 for reproduction of the recording on section 3 of the tape in the same manner as previously described in connection with section 1 of the tape.

When reproduction of section 3 has been completed, the fourth control area 10*c* on the tape bridges the contact wheels 115 and 116 and causes the stepping switch to be advanced from position No. 3 to position No. 4 by energization of the relay 151. Current to the speaker 165 is now discontinued by bank 6 of the stepping switch, and a relay 168 (Figure 11) is energized through bank 2 of the stepping switch to close gang switches 170, 171, 172 and 173.

The closing of the switch 170 supplies current to energize the solenoid 44 through a rectifier circuit 175. The energization of solenoid 44 causes the idler friction wheel 38 to be disengaged from the forward motor shaft 32 and from the wheel 36, through the medium of the solenoid core 43, link 42 and bearing block 40, so as to free the forward reel 27 from the motor 31.

Actuation of the switch 171 by the relay 168 discontinues the supply of current to the forward motor 31 and supplies current to the reverse motor 30 so as to drive the reverse motor at a high speed in the counter-clockwise direction as viewed in Figure 1 and thus rapidly rewind the tape upon the reverse reel 28.

Closing of the switch 172 supplies current to energize the solenoid 90 so as to shift the friction roller 70 out of engagement with the capstan 72 by actuation of the arm 65 through the medium of the rod 87, and to raise the tape clear of the heads 100 and 101 by actuation of the member 106, as well as to apply a braking force to the forward reel 27 by engagement of the brake shoe 96 with the wheel 36 of the forward reel spindle 25, through the medium of the lever 92 and rod 94.

Closing of the switch 173 by the solenoid 44 supplies current to energize a relay 177, and to charge a condenser 178, which causes a switch 179 to be closed for the purpose of maintaining the solenoid 90 energized after the supply of current thereto is discontinued through switch 172, as will be later fully described.

As the rewinding movement of the tape is initiated, the fourth control area 10*c* on the tape which had passed beyond the contact wheels 115 and 116 during the final forward feeding movement of the tape, repasses the contact wheels and again momentarily bridges them so as to cause the stepping switch 150 to be advanced from position No. 4 to position No. 5. As each of the succeeding control areas 10*b* and 10*a* bridges the contact wheels 115 and 116 during this rewinding movement of the tape, the stepping switch is successively advanced to positions Nos. 6 and 7.

When the control area 10 of the tape bridges the contact wheels 115 and 116 during the final rewinding movement of the tape, the stepping switch is advanced from position No. 7 to position No. 8, and the supply of current to the relay 168 through bank 2 of the stepping switch is discontinued, so as to restore the gang switches 170, 171, 172 and 173 to their original positions shown in Figure 11.

When the switch 173 is thus opened by deenergization of the relay 168, the condenser 178 discharges through the relay 177 to hold the switch 179 closed for a short interval and thus maintain the solenoid 90 energized so as to retain the friction roller 70 out of engagement with the capstan 72 until movement of the tape ceases, thus obviating breaking the tape.

During the reproduction of section 1 of the tape, or during the reproduction of succeeding sections, the operator may choose to either reproduce the selected sections once, or to repeat these sections indefinitely. For a single reproduction, the switch 23 is moved to its full line position in Figure 11, and the switch 23*a* is opened, so that current to supply all electrical units of the machine is provided only through bank 1 of the stepping switch 150 when occupying positions Nos. 1 to 7, inclusive. Therefore, after the selected sections on the tape T have been reproduced once and the tape has been rewound for the next cycle of operation, the supply of current to the machine will be discontinued as the stepping switch will have been advanced to position No. 8, so that current is no longer being supplied through bank 1 of the stepping switch.

However, if the switch 23 is permitted to remain in its position shown in broken lines in Figure 11, and the switch 23*a* to remain closed following starting of the machine, the above described operation for a single reproduction of selected sections of the tape will be performed with the exception that when the stepping switch 150 has been advanced to position No. 8, the switch 23*a* will continue to supply current to the machine, while current will be supplied to the coil 151 of the stepping switch through the switch 23, bank 4 of the stepping switch, and through the switch 180 of the stepping switch, which latter is opened by the coil 151 when the coil is energized, thus causing the stepping switch to be advanced from position No. 8 to position No. 9, and the reproduction of all selected sections of the tape to be repeated. So long as the switches 23 and 23*a* are permitted to remain in this position, continuous operation of the machine will be effected.

The manually operable switch 24*a* functions when closed, to supply current to the machine irrespective of the position of the stepping switch 150, whereas a second manually operable and normally open switch 185 is operable when closed, to advance the stepping switch to position No. 9 through bank 5 thereof. Thus, the stepping switch can always be manually restored to its starting or No. 9 position should any emergency arise such as breaking of the tape, for example. Also, in an emergency, the switch 24 may be moved to its position shown in broken lines in Figure 11, so as to discontinue the supply of current to all electrical units except the solenoid 90, to thus enable the machine to be stopped instantly.

It will be manifest that although a 6 bank, 9 position stepping switch is shown in conjunction with three selector switches 20, 21 and 22 to enable any one or more of three recordings on the tape T to be selectively reproduced, that the principle of this invention is applicable to a stepping switch of a larger number of positions in conjunction with a record medium divided by the proper number of suitably treated electro-responsive areas 10, 10*a* and etc., into a larger number of sections individually selectable by manually operable selector switches for reproduction or skipping.

We claim:

1. In a magnetic sound reproducing machine employing a magnetizable record medium having electrical control areas along the length of the medium between and at the ends of separate recordings on the medium, so as to divide the latter into sections, a magnetic reproducing head traversed by the record medium during feeding thereof; electrical circuits including a stepping switch and a plurality of manually operable selector switches by which any one or more of said sections of the record medium may be selected for reproduction or skipping; a trigger circuit controlling the stepping switch and including a tetrode tube and a switch device traversed by said record medium and adapted to be engaged by each control area of the record medium in succession as the medium is being fed; means operable in response to engagement of said switch device by a control area of the record medium to energize the trigger circuit and cause the tetrode tube to energize the stepping switch and actuate same; means operable in response to an actuation of the stepping switch by engagement of said switch device by that control area of the record medium in advance of a section thereof selected for reproduction, to drive the record medium forwardly at reproducing speed; and means operable in response to an actuation of the stepping switch by engagement of said switch device by that control area of the record medium in advance of a section thereof selected for skipping, to drive the record medium forwardly at a relatively high speed so as to rapidly skip such section.

2. In a magnetic sound reproducing machine employing a magnetizable record medium having control areas along the length thereof between and at the ends of recordings on the medium, so as to divide the latter into sections, a magnetic reproducing head traversed by said record medium during feeding of the latter; forward and reverse reels on which said record medium may be wound; a capstan; a friction roller mounted for movement to normally press the record medium into driving engagement with the capstan; electrical circuits including a stepping switch, a plurality of manually operable selector switches by which any one or more of said sections of the record medium may be selected for reproduction or skipping; a control circuit for the stepping switch including an electron tube, rotatably mounted contact wheels about which said record medium is trained and adapted to be bridged by said control areas of the medium; means responsive to one presetting of the selector switches for reproduction of sections of said record medium, to drive the capstan at reproducing speed and the forward reel at take-up speed when that control area of the record medium in advance of a section of the medium selected for reproduction, bridges said contact wheels; means responsive to another presetting of said switches for skipping of sections of the record medium, to disengage said friction roller from the capstan so as to render the latter ineffective to drive the record medium, and to drive the forward reel at a relatively high speed, when that control area in advance of a section of the record medium selected for skipping, bridges said contact wheels; means responsive to bridging of a control area of the record medium following reproduction or skipping of the last section of the medium, to drive the reverse reel at a relatively high speed and rewind the record medium thereon; means operable during the rewinding operation, to disengage the friction roller from the capstan and to shift the record medium clear of the reproducing head; braking means for the forward reel; means operable during rewinding of the record medium on the reverse reel, to actuate said braking means and apply sufficient braking force to the forward reel to prevent overrunning thereof; means operable upon completion of the rewinding operation, to discontinue driving the reverse reel and release the braking means so as to free the forward reel therefrom; and manually controlled means by which the aforestated means will be caused to repeat the reproduction and skipping operations upon sections of the record medium automatically in accordance with the presetting of said selector switches.

References Cited in the file of this patent

UNITED STATES PATENTS

| | | |
|---|---|---|
| 2,294,854 | Steed | Sept. 1, 1942 |
| 2,396,409 | Berzer | Mar. 12, 1946 |
| 2,430,538 | Somers | Nov. 11, 1947 |
| 2,468,198 | Heller | Apr. 26, 1949 |
| 2,518,117 | Birkes et al. | Aug. 8, 1950 |
| 2,519,245 | Greenleaf et al. | Aug. 15, 1950 |
| 2,535,486 | Dank | Dec. 26, 1950 |
| 2,560,254 | Shickel | July 10, 1951 |
| 2,631,855 | Kornei | Mar. 17, 1953 |